United States Patent
Schooley

(10) Patent No.: US 8,579,664 B1
(45) Date of Patent: Nov. 12, 2013

(54) ETHERNET CONNECTOR WITH INTEGRATED USB

(71) Applicant: Google Inc., Mountain View, CA (US)

(72) Inventor: Stephen Schooley, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/658,137

(22) Filed: Oct. 23, 2012

(51) Int. Cl.
H01R 25/00 (2006.01)

(52) U.S. Cl.
USPC ........ 439/638; 439/218; 439/541.5; 439/660; 439/915; 439/957

(58) Field of Classification Search
USPC .............. 439/218, 541.5, 638, 653, 654, 660, 439/915, 957
See application file for complete search history.

(56) References Cited

U.S. PATENT DOCUMENTS

| 4,241,974 | A | * | 12/1980 | Hardesty | 439/638 |
| 4,611,875 | A | * | 9/1986 | Clarke et al. | 439/638 |
| 5,651,690 | A | * | 7/1997 | Klas et al. | 439/352 |
| 6,027,375 | A | * | 2/2000 | Wu | 439/607.02 |
| 7,044,790 | B2 | * | 5/2006 | Zhu et al. | 439/607.27 |
| 7,108,562 | B2 | * | 9/2006 | Liao | 439/676 |
| 7,255,567 | B1 | * | 8/2007 | Liao | 439/11 |
| 7,618,262 | B2 | * | 11/2009 | Fogg et al. | 439/65 |
| 7,648,390 | B2 | * | 1/2010 | Zhang et al. | 439/541.5 |
| 7,789,706 | B2 | * | 9/2010 | Chen et al. | 439/607.35 |
| 7,828,569 | B2 | * | 11/2010 | Aronson et al. | 439/218 |
| 7,841,902 | B2 |  | 11/2010 | Chow et al. |  |
| 7,862,378 | B1 | * | 1/2011 | Wan et al. | 439/607.35 |
| 7,887,370 | B2 | * | 2/2011 | Chen et al. | 439/607.35 |
| 2005/0186854 | A1 | * | 8/2005 | Huang | 439/677 |
| 2008/0214052 | A1 |  | 9/2008 | Li |  |
| 2008/0268677 | A1 |  | 10/2008 | Hsu |  |
| 2011/0117787 | A1 | * | 5/2011 | Shu et al. | 439/660 |
| 2011/0124220 | A1 | * | 5/2011 | Su et al. | 439/449 |
| 2011/0269324 | A1 | * | 11/2011 | Ko | 439/218 |
| 2012/0088412 | A1 | * | 4/2012 | Mattson et al. | 439/660 |
| 2012/0322310 | A1 | * | 12/2012 | Taylor | 439/620.23 |

* cited by examiner

Primary Examiner — James Harvey
(74) Attorney, Agent, or Firm — Morris & Kamlay LLP

(57) ABSTRACT

Manufacturers or vendors may desire to occlude connection ports on a device that are used to upload software onto the device. An implementation discloses inserting two pins into a first cavity of an Ethernet connector and two additional pins into a second cavity of the Ethernet connector. The pins may be bent over the connector and soldered to a printed circuit board. The four pins may correspond to the at least four pins required by a USB specification. Also disclosed is an adapter or cable that may connected.

13 Claims, 5 Drawing Sheets

US 8,579,664 B1

ETHERNET CONNECTOR WITH INTEGRATED USB

BACKGROUND

Electronic devices (e.g., computing devices, stereo receivers, smartphones, and the like) routinely have software preloaded on them by a manufacturer or vendor. The software may not be intended to be exposed to or accessible by the user or consumer to be modified (e.g., updated, modified, or added to). Device manufacturers may utilize a variety of data transfer methods to program the electronic devices. For example, many devices have ports or connectors on them, some of which may be proprietary, such as an Ethernet connector or a USB connector. The ports or connectors may be utilized by a manufacturer or vendor to program or upload computer code or software onto a device. An Ethernet connector (e.g., compatible with 8P8C or RJ45) may contain two LEDs above or below the Ethernet port on the left and right respectively. The LEDs indicate activity (e.g., data transmission/receipt) or power. A variety of Ethernet ports and cables exist, for example, category 5 or category 6 Ethernet cables.

USB also has a variety of connector shapes (e.g., mini, micro) that may have subtypes (e.g., micro-A or micro-B). Device manufacturers or vendors may desire to obscure the presence of the connectors to prevent malware from being loaded onto a device. In addition, the presence of a port or connector may imply functionality to a user. For example, a USB port may exist on a device to allow the device manufacturer or vendor the ability to program the device. However, the presence of a USB port on a device may indicate to a consumer or user the ability to connect a USB-capable device, despite the port having no such purpose for the end-user.

BRIEF SUMMARY

According to an implementation of the disclosed subject matter, a method of manufacturing an Ethernet connector with additional connectivity is provided. The Ethernet connector may have two cavities (e.g., spaces typically occupied by LED lights in the Ethernet connector as described above). The Ethernet connector may have a front end and a back end. The cavities may appear at the front end of the Ethernet connector. A first contact may be inserted into the first cavity. The first contact may include a first pin and a second pin. The first pin may be separated from the second pin by a first non-conductive divider. A second contact may be inserted into the second cavity. The second cavity may include a third pin and fourth pin. The third pin and the fourth pin may be separated by a second non-conductive divider. To avoid electrical interference, it may be desirable that the pins not contact one another directly; thus, the first and second non-conductive dividers may have any thickness. The first non-conductive divider, the second non-conductive divider, or both the first and second non-conductive dividers may be present at least at the front end of the Ethernet connector. A non-conductive divider may also run the entire length of the connector (e.g., separating the first pin from the second pin along the entire length of the connector). One or more of the pins may be bent over the Ethernet connector. Regardless of whether one or more of the pins are bent over the Ethernet connector, the pins may be soldered to a printed circuit board.

In an implementation of the disclosed subject matter, a device is disclosed with four pins corresponding to, for example, the four pins of the USB 2.0 specification. The pins on the second device may align with the pins on the first device, as described above. A non-conductive divider may appear at least at an end of the second device. For example, the non-conductive divider may separate two pins along the length of the second device. An end of the second device may contain a conventional or standard USB port, such as a micro-USB port or mini-USB port. In an implementation, the device may be, for example, a cable that has a conventional USB connector at one end and four pins that align with or contact the pins on the first device.

Additional features, advantages, and implementations of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

The disclosed subject matter proposes a first device that may include a conventional Ethernet connector that is modified or manufactured to have pins inserted into it. The pins may be sufficient collectively to provide data transport over USB. The Ethernet connector may have the pins disposed into a first cavity and a second cavity to provide connectivity, such as USB, in addition to an Ethernet connection. The additional pins inserted into the first and second cavities may not be immediately apparent to an untrained user. For example, some Ethernet connectors contain LED indicator lights in a first and second cavity. Instead of LEDs, however, the spaces may be used to provide hardware that is sufficient for USB data transport.

A second device is also disclosed herein that connects to the first device. The second device may be configured such that the pins in the separate cavities of the first device may be brought into proximity of one another in the second device in the form of a conventional USB port or plug. The USB port or plug may then be accessed similarly to a conventional USB port or plug to provide or receive data from or transmit data to the device on which the first device is mounted.

Figure 1:
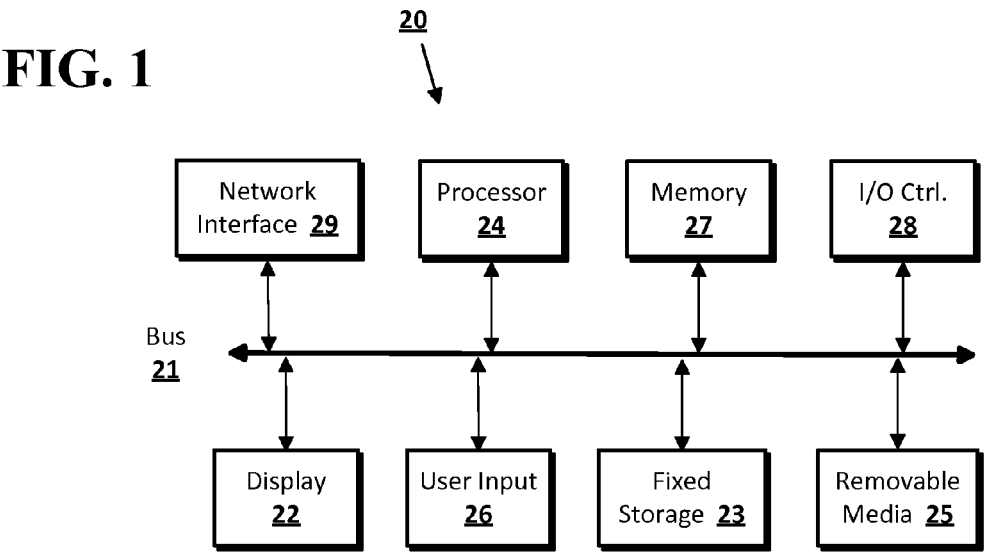
FIG. 1 shows a computer according to an implementation of the disclosed subject matter.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like. A conventional Ethernet port may be connected to the I/O controller 28 or function similarly to it and be interconnected to other components of the computer 20 by the bus 21.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25. The bus 21 also allows data transport between an Ethernet connector and RAM, ROM, or fixed storage 23.

Figure 2:
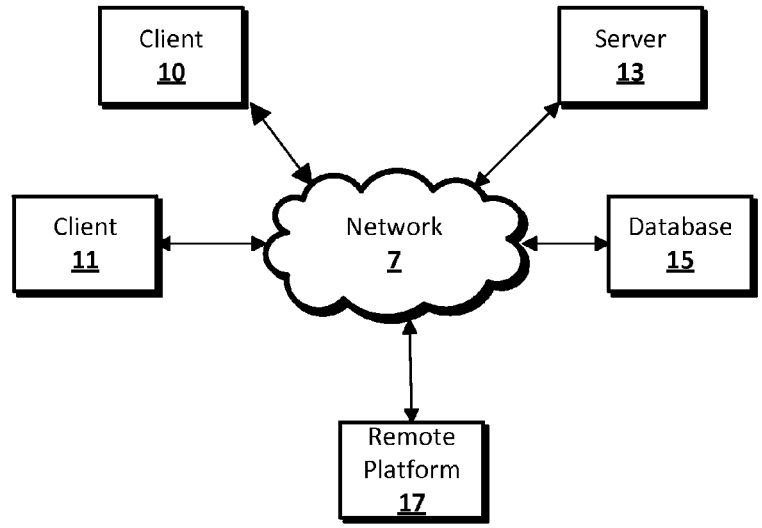
FIG. 2 shows a network configuration according to an implementation of the disclosed subject matter.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2. The network interface 29 may be, for example, an Ethernet connector. The Ethernet connector may be used for two way or one way access by or to the network 7 or other computers (e.g., mainframes, servers, or personal computers).

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3A:
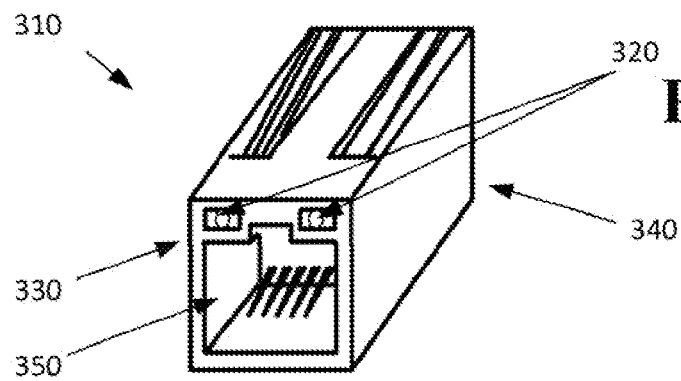
FIG. 3A is an example of an Ethernet connector with LED indicator lights in it.
Figure 4:
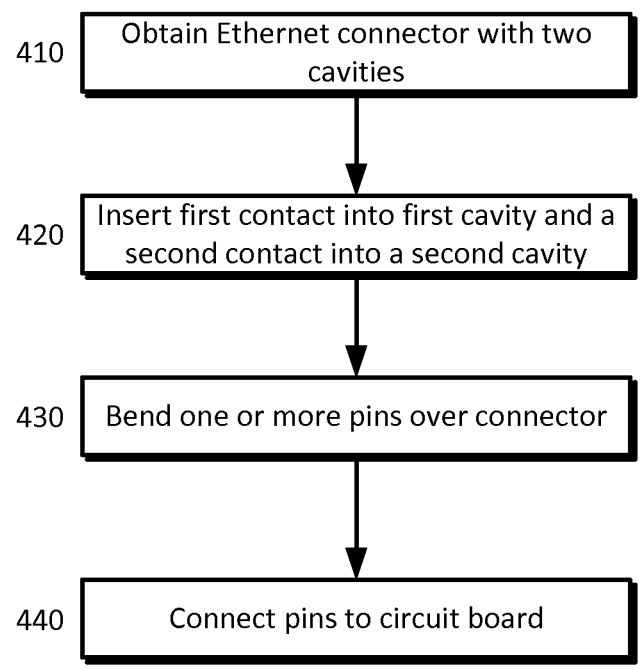
FIG. 4 shows an example process flow according to an implementation of the disclosed subject matter.
Figure 5:
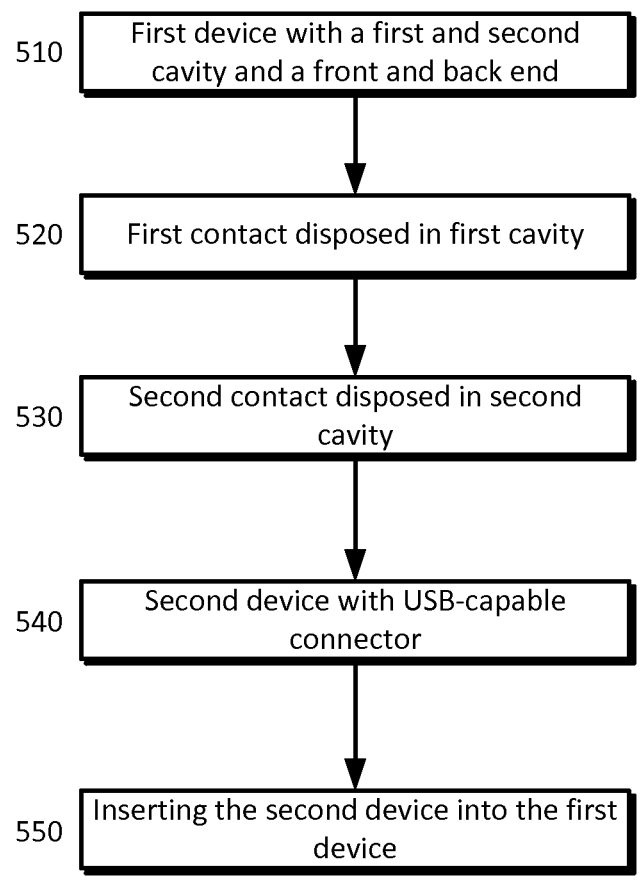
FIG. 5 is an example process for creating a system with first and second devices according to an implementation of the disclosed subject matter.

In an implementation, a method for manufacturing a device is disclosed, the process for which is shown in FIG. 4. An Ethernet connector may be obtained at 410. The Ethernet connector may have a first cavity, a second cavity, a front end, and a back end. An example of such a connector is shown in FIG. 3A. The Ethernet connector 310 in FIG. 3A has LED indicator lights at 320 located on the front side 330 of the Ethernet connector. Typically, one of the LEDs 320 is green and represents the presence of power to the connector 310. The other light 320 may indicate network activity (e.g., data transport). The LEDs occupy two separate cavities on the connector 310. The back end 340 of the connector may be connected to a printed circuit board such as a main board of a server or a network interface card that may be inserted into a PCI slot of a main board. A variety of Ethernet connectors are known in the art. Examples include RJ45 compatible jacks (e.g., connectors), and 10BASE-T, 100BASE-TX, and 1000BASE-T compatible jacks.

Figure 3B:
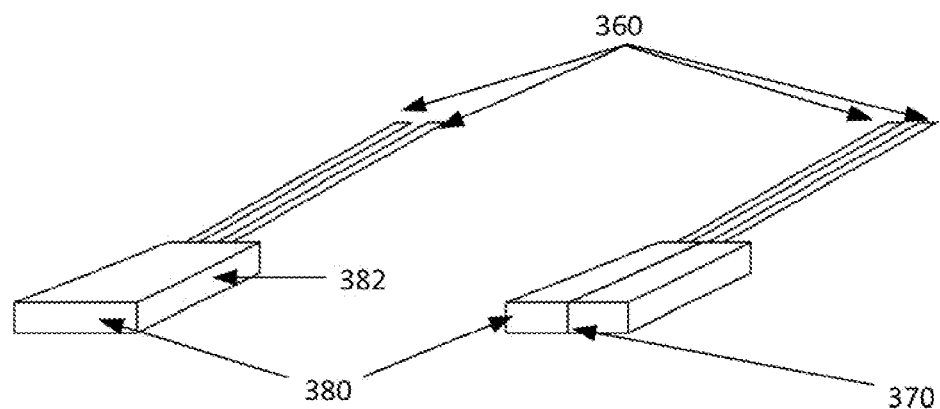
FIG. 3B shows two examples of contacts suitable for use with implementations of the disclosed subject matter.
Figure 3C:
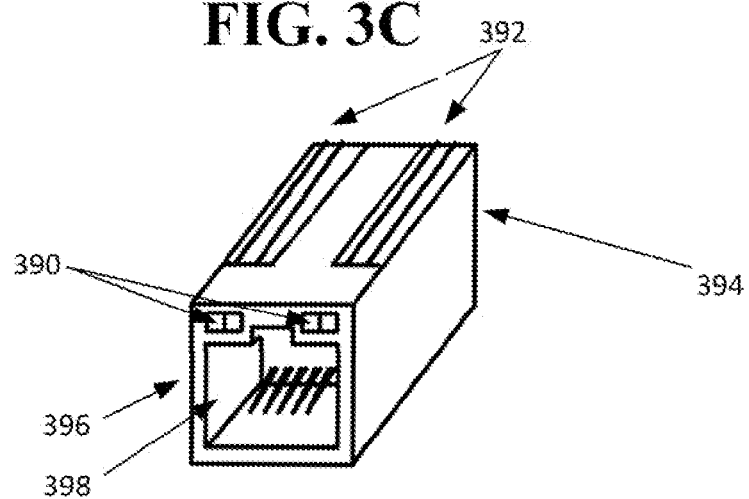
FIG. 3C is a connector with two contacts inserted in the cavities near the Ethernet port according to an implementation disclosed herein.

Returning to FIG. 4, at 420, a first contact may be inserted into the first cavity of the Ethernet connector and, similarly, a second contact may be inserted into a second cavity of the Ethernet connector. An example of such a contact 380 is shown in FIG. 3B on the left panel. A contact may include one or more pins 360. In the case of USB 2.0, four total pins 360 are specified by the USB 2.0 specification. In no way shall any implementation disclosed herein be limited to only the USB 2.0 specification. More specifically, implementations may equally apply to the USB 1.1 specification or similar specifications. The first contact may have a first pin and a second pin 360. The second contact may have a third pin and a fourth pin 360. At or towards the front end of the contact 382, the first and second pin may be electrically connected, either directly or indirectly, to one another by a material. The material may be in the shape of the first cavity or the second cavity such that it may fill or nearly fill the first or second cavity if inserted therein as shown in FIG. 3C. The contacts, with non-conductive dividers in this example, have been inserted into the first and second cavity at 390 at the front end of the connector 396. The pins are shown extending toward the back end of the connector at 394 and have been bent over the connector 392. The Ethernet port 398 may be unmodified and operate as a conventional Ethernet jack.

To avoid electrical interference between two adjacent pins (or wires), a non-conductive divider 370 may be used to separate the pins as shown in the right contact in FIG. 3B. Several non-conductive materials, such as plastic, silicon, rubber, wood, and fiberglass, may be used as such in the first device, as will be readily apparent to one of skill in the art. As an alternative to a non-conductive divider, or in addition thereto, the pins may be implemented by individually shielded wire, for example, to minimize electromagnetic interference.

The pins inserted into the first cavity and the second cavity are discussed in the context of USB; however, more than two pins may be inserted into either the first or second cavity or both the first and second cavities. A larger number of pins may enable other specialized connectors available both now and that may arise in the future. For example, SATA is an interface for connecting storage drives (e.g., hard drives or optical drives) or other devices to a host computer, such as via a bus 21 as shown in FIG. 1. In some configurations, SATA requires seven pins to operate. In accordance with any implementation disclosed herein, three pins may be inserted into a first cavity and four pins may be inserted into the second cavity. The pins may correspond to those required by SATA 3.2 specification. Other forms of SATA connectors may also be used (e.g., SATA power connectors, slimline SATA connector or SATA 2.6, eSATA). Thus, any number of pins may be inserted through the first and/or second cavity and the pins may be shielded, separated by a non-conductive divider, or otherwise modified to comply with an IEEE standard or like specification.

In some configurations, more than two cavities may be used and, therefore, more than two contacts may be inserted into a conventional connector. In some configurations, all of the pins sufficient to provide functionality of a connector may be provided through a single cavity of the conventional connector. For example, the four pins required for USB 2.0 may be connected by a first contact. The first contact may be inserted into a first cavity of a connector such as an Ethernet connector. A second device may be used to adapt the pins contained within the first contact in this example to a conventional USB-capable port. In some configurations, it may be desirable to separate the pins or wires required to provide functionality of the added port so that they are not immediately identifiable by a user.

In some configurations, at 430 it may be desirable to fold the pins over the back end of the Ethernet connector 394. In other instances, it may be preferable to mount the pins to a circuit board without bending the pins or to mount the connector on its top side (i.e., the side where the pins are exposed). The pins may be connected to a circuit board at 440. The circuit board may be part of, for example, another circuit board of a computer, such as a motherboard, or it may be a component of a network interface card. A connection between one or more of the pins and the circuit board may be formed by a variety of methods including soldering, gluing, or fastening, as is well understood by a skilled artisan.

In an implementation, a first device is disclosed at 510 that includes a first cavity, a second cavity, a front end, and back end. For example, the first device may include an Ethernet connector such as the one shown in FIG. 3A. A first contact may be disposed in the first cavity at 520. The first contact may include a first pin and a second pin. The pins may be separated by a non-conductive divider. Both the non-conductive divider and the contact have been described above and examples are provided in FIG. 3B. The non-conductive divider may extend along the length of the pins or just exist at the front end of the connector 330. A second contact may be disposed in the second cavity at 530. The second contact may include a third pin and fourth pin. The third and fourth pins may be separated by a non-conductive divider, as illustrated in FIG. 3B. The second cavity may be identical in size to the first cavity such that the first contact and the second contact may be interchangeable. The device may be connected to a circuit board.

A second device also may be configured to connect to the first device described herein. The second device may include a USB-capable connector. For example, the second device may have an end that aligns four pins to the pins located in the first and second cavities of the first device. The pins on the second device maybe formed into a conventional USB port at a second end of the second device. For example, the USB-capable connector may be a USB cable that protrudes from the device. One end of the cable may align with the pins on the first device while the other end of the second device may have a conventional male or female USB port or adapter.

In an implementation, a system is disclosed that includes a first device and a second device. The first device may include an Ethernet connector that has a first contact and a second contact, such as the contacts shown in in FIG. 3B. Each contact may have one or more wires or pins contained or bound by it. One or more of the individual wires or pins may be individually shielded or separated by a non-conductive divider. The pins may be separated over at least a portion of the first device. The first contact may be disposed in a first cavity of the Ethernet connector and the second contact is disposed in a second cavity of the Ethernet connector. Typically, the first and second cavity are located at the front end of the Ethernet connector. In some configurations, the cavities may be asymmetrically arranged or disposed on the Ethernet connector.

In some instances, the second device may include a USB-capable connector at 540, a third contact arranged to connect to the first contact and a fourth contact arranged to connect to the second contact. The third contact and the fourth contact may include a fifth pin and sixth pin and a seventh and eighth pin respectively. The pins may be separated by a non-conductive divider over at least a portion of the device. For example, the fifth and sixth pins may be separated, and/or the seventh and eighth pins may be separated. At least a part of the second device may be inserted into the first device at 550 in some configurations. The insertion of the second device into the first device may cause the first pin of the first contact to connect with the fifth pin of the third contact, the second pin of the first contact to connect with the sixth pin of the third contact, the third pin of the second contact to connect with the seventh pin of the fourth contact and the fourth pin of the second contact to connect with the eighth pin of the fourth contact. Thus, the back end of the second device may connect to the front end of the first device. It may not be necessary that either device is inserted into another, merely that the pins on each device contact at least some of the pins on the other device.

An end of the second device may contain a standard USB port (e.g., a micro-USB port or mini-USB port). In another implementation, the second device may be, for example, a cable that has a conventional USB connector at one end and four pins that align with or contact the pins on the first device. In some configurations, it may be desirable to maintain connectivity to the Ethernet connector of the first device. Thus, the second device may expose an Ethernet connector into which a standard or conventional Ethernet cable may be connected. For any of the foregoing implementations, the terms USB connector or USB port may include any physical configuration including mini, micro, etc.

Similar to the first device, the second device also may be compatible with other connector types such as SATA. For example, the first device may have pins connected to a SATA data channel and the second device may have pins that align with the pins of the first device to provide a standard SATA connector. Thus, the second device, similar to the first device, is not limited to USB and may have more or fewer than four pins inserted into the cavities contained within it. Also, similar to the first device, the pins may also be asymmetrically distributed, that is, one cavity may have more or fewer pins than another cavity.

Figure 6A:
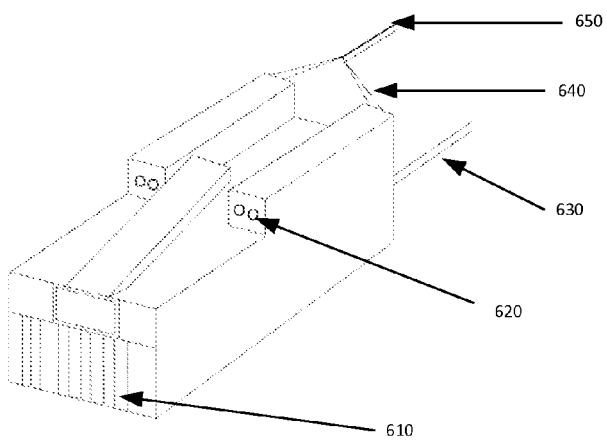
FIG. 6A shows an example of a device according to an embodiment disclosed herein in which wires are exposed on the front side of the connector.
Figure 6B:
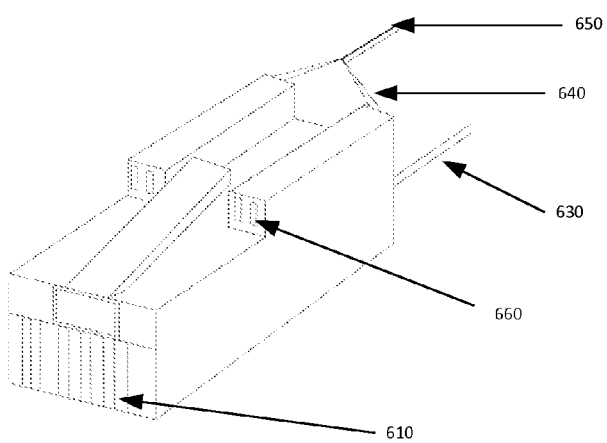
FIG. 6B shows an example of a device according to an embodiment of the disclosed subject matter in which the wires are connected to or into spring-mounted contacts.
Figure 6C:
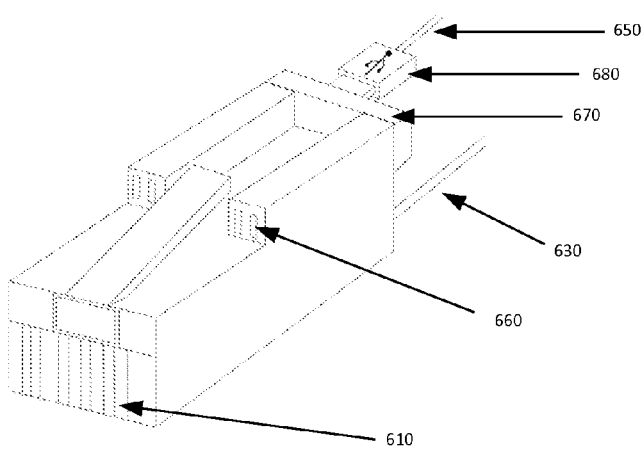
FIG. 6C, shows an example device according to an embodiment of the disclosed subject matter in which a printed circuit board is attached to the connector.

FIGS. 6A-6C show example configurations of a second device according to implementations disclosed herein. In the examples shown, the device is configured to connect to an Ethernet port that has additional connectors as disclosed herein. Ethernet pins 610 are typically found in a male Ethernet connector on the front side of the connector. As previously disclosed, wires are disposed through a first and second cavity of the second device. In FIG. 6A, the wires are exposed on the front side of the connector as POGO pins 620 while in FIG. 6B they are spring-mounted contacts 660. The specific connectors shown are provided as examples only, and generally any type of connector may be used. Regardless of the method selected for exposing the wires in the cavities, they may align with the wires present in the first and second cavity of the first device described earlier. On the back side of the device, the wires may correspond to those required for USB. Each of the leads 640 from the individual wires may be joined to form a USB cable 650. The USB cable 650 may have a conventional connector (not shown) that may be connected to another device (e.g., a computer). Separately, an Ethernet cable 630 may be found on the back end of the device. In FIG. 6C, a printed circuit board ("PCB") 670 is shown attached to the connector. The PCB 670 may be manufactured as a component of the second device or as a stand-alone component that may be connected to the second device. The PCB 670 may conform the four wires that occupy the first and second cavity into a convention female USB port. As a specific illustrative example, FIG. 6C shows a micro-USB 680 connector inserted into the PCB 670.

Notably, implementations of the subject matter disclosed herein may provide a connector that includes a conventional connector, such as an Ethernet connector, as well as the additional connections and connector configurations disclosed herein. For example, FIG. 3 shows an example of a connector that includes a conventional Ethernet connector, which can be used by conventional Ethernet cables and connectors to communicate with a device in which the connector is placed, and the additional connections 390, which may allow for an additional connector as disclosed herein. Generally, such additional connectors may be provided without negatively affecting the functionality or availability of the conventional connector with which they are integrated, and/or without alerting an end user to the presence of the additional connector.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A first device comprising:
   an Ethernet connector, the Ethernet connector having a first cavity, a second cavity, a front end, and a back end;
   a first contact disposed in the first cavity, the first contact comprising a first pin and a second pin, the first pin separated from the second pin by a first non-conductive divider at least at the front end of the Ethernet connector;
   a second contact disposed in the second cavity, the second contact comprising a third pin and a fourth pin, the third pin separated from the fourth pin by a second non-conductive divider at least at the front end of the Ethernet connector; and
   a second device configured to connect to the first device and comprising a USB capable connector.

2. The device of claim 1, wherein the USB capable connector comprises a USB cable, the USB cable protruding from the device.

3. The device of claim 1, further comprising an Ethernet capable connector.

4. The device of claim 3, wherein the USB capable connector and Ethernet capable portion comprise a single cable, the cable protruding from the device.

5. The device of claim 1, wherein the pins are connected to a circuit board.

6. The device of claim 1, wherein each of the first, second, third, and fourth pins are folded over the Ethernet connector.

7. The device of claim 1, wherein the first and second non-conductive divider comprises plastic.

8. The device of claim 6, wherein the pins are connected to a circuit board by soldering.

9. A system comprising:
a first device, the first device comprising an Ethernet connector having a first contact and a second contact, wherein the first contact is disposed in a first cavity of the Ethernet connector and comprises a first pin and a second pin, wherein the first pin is separated from the second pin by a first non-conductive divider for at least a portion of the first device; and
a second device comprising a USB capable connector, a third contact arranged to connect to the first contact, and a fourth contact arranged to connect to the second contact.

10. A system comprising:
a first device, the first device comprising an Ethernet connector having a first contact and a second contact, wherein the second contact is disposed in a second cavity of the Ethernet connector and comprises a third pin and a fourth pin, wherein the third pin is separated from the fourth pin by a second non-conductive divider for at least a portion of the first device; and
a second device comprising a USB capable connector, a third contact arranged to connect to the first contact, and a fourth contact arranged to connect to the second contact.

11. A system comprising:
a first device, the first device comprising an Ethernet connector having a first contact and a second contact; and
a second device comprising a USB capable connector, a third contact arranged to connect to the first contact, and a fourth contact arranged to connect to the second contact, wherein the third contact comprises a fifth pin and a sixth pin and the fourth contact comprises a seventh pin and an eighth pin and wherein the fifth pin is separated from the sixth pin by a third non-conductive divider for at least a portion of the second device.

12. A system comprising:
a first device, the first device comprising an Ethernet connector having a first contact and a second contact; and
a second device comprising a USB capable connector, a third contact arranged to connect to the first contact, and a fourth contact arranged to connect to the second contact, wherein the third contact comprises a fifth pin and a sixth pin and the fourth contact comprises a seventh pin and an eighth pin and wherein the seventh pin is separated from the eighth pin by a fourth non-conductive divider for at least a portion of the second device.

13. A system comprising:
a first device, the first device comprising an Ethernet connector having a first contact and a second contact;
a second device comprising a USB capable connector, a third contact arranged to connect to the first contact, and a fourth contact arranged to connect to the second contact, wherein the third contact comprises a fifth pin and a sixth pin and the fourth contact comprises a seventh pin and an eighth pin and wherein at least a part of the second device is inserted into the first device and the insertion causes:
the first pin of the first contact to connect with the fifth pin of the third contact;
the second pin of the first contact to connect with the sixth pin of the third contact;
the third pin of the second contact to connect with the seventh pin of the fourth contact; and
the fourth pin of the second contact to connect with the eighth pin of the fourth contact.

* * * * *